US011581579B2

(12) United States Patent
Li et al.

(10) Patent No.: US 11,581,579 B2
(45) Date of Patent: Feb. 14, 2023

(54) LITHIUM ION SECONDARY BATTERY

(71) Applicant: Contemporary Amperex Technology Co., Limited, Ningde (CN)

(72) Inventors: Zhiqiang Li, Ningde (CN); Changlong Han, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 195 days.

(21) Appl. No.: 17/052,811

(22) PCT Filed: Aug. 29, 2019

(86) PCT No.: PCT/CN2019/103218
§ 371 (c)(1),
(2) Date: Nov. 4, 2020

(87) PCT Pub. No.: WO2020/043153
PCT Pub. Date: Mar. 5, 2020

(65) Prior Publication Data
US 2021/0242498 A1 Aug. 5, 2021

(30) Foreign Application Priority Data

Aug. 31, 2018 (CN) .......................... 201811014430

(51) Int. Cl.
| | | |
|---|---|---|
| *H01M 10/0567* | (2010.01) | |
| *H01M 10/0568* | (2010.01) | |
| *H01M 10/0525* | (2010.01) | |
| *H01M 4/04* | (2006.01) | |
| *H01M 4/485* | (2010.01) | |
| *H01M 4/505* | (2010.01) | |
| *H01M 4/525* | (2010.01) | |
| *H01M 4/62* | (2006.01) | |
| *H01M 4/02* | (2006.01) | |

(52) U.S. Cl.
CPC ..... *H01M 10/0567* (2013.01); *H01M 4/0404* (2013.01); *H01M 4/485* (2013.01); *H01M 4/505* (2013.01); *H01M 4/525* (2013.01); *H01M 4/623* (2013.01); *H01M 10/0525* (2013.01); *H01M 10/0568* (2013.01); *H01M 2004/027* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| | | | | |
|---|---|---|---|---|
| 2002/0028389 | A1* | 3/2002 | Sonoda | H01M 10/0568 429/324 |
| 2015/0221977 | A1* | 8/2015 | Hallac | H01M 10/0567 429/163 |
| 2015/0311522 | A1 | 10/2015 | Fang et al. | |
| 2016/0079589 | A1* | 3/2016 | Ohara | H01M 10/0525 429/163 |
| 2020/0014021 | A1* | 1/2020 | Niida | H01M 4/505 |

FOREIGN PATENT DOCUMENTS

| | | |
|---|---|---|
| CN | 103503204 A | 1/2014 |
| CN | 103730692 A | 4/2014 |
| CN | 105098177 A | 11/2015 |
| CN | 105406124 A | 3/2016 |
| CN | 106025336 A | 10/2016 |
| CN | 106025359 A | 10/2016 |
| CN | 106252639 A | 12/2016 |
| CN | 106252716 A | 12/2016 |
| CN | 106505249 A | 3/2017 |
| CN | 104600314 B | 5/2017 |
| CN | 106941192 A | 7/2017 |
| CN | 107293776 A | 10/2017 |
| CN | 107534185 A | 1/2018 |

(Continued)

OTHER PUBLICATIONS

Shou-Dong Xu, Quan-Chao Zhuang, Jing Wang, Ya-Qian Xu, Ya-Bo Zhu. New Insight into Vinylethylene Carbonate as a Film Forming Additive to Ethylene Carbonate-Based Electrolytes for Lithium-Ion Batteries, Int. J. Electrochem. Sci., 8 (2013) 8058-8076. (Year: 2013).*

The First Office Action for Japan Application No. 2021-507947, dated Feb. 1, 2022, 8 pages.

The First Office Action for China Division Application No. 202110252353.0, dated Dec. 16, 2021, 10 pages.

The First Examination Report for EP Application No. 19855763.9, dated Mar. 25, 2022, 7 pages.

The International search report for PCT Application No. PCT/CN2019/103218, dated Nov. 28, 2019, 13 pages.

(Continued)

*Primary Examiner* — Carlos Barcena
(74) *Attorney, Agent, or Firm* — East IP P.C.

(57) ABSTRACT

The present application discloses a lithium ion secondary battery comprising a positive electrode plate, a negative electrode plate, a separator and an electrolyte, wherein the positive electrode plate comprises a positive electrode current collector and a positive electrode film provided on at least one surface of the positive electrode current collector, and the positive electrode film comprises a first positive electrode active material represented by chemical formula $Li_{1+x}Ni_aCo_bMe_{1-a-b}O_{2-y}A_y$, and a second positive electrode active material represented by chemical formula $Li_{1+z}Mn_cN_{2-c}O_{4-d}B_d$; the positive electrode plate has a resistivity r of 3500 Ω·m or less; and the electrolyte comprises a fluorine-containing lithium salt type additive. The lithium ion secondary battery provided by the present application is capable of satisfying high safety performance, high-temperature storage performance and cycle performance simultaneously.

17 Claims, No Drawings

(56) References Cited

FOREIGN PATENT DOCUMENTS

| | | |
|---|---|---|
| CN | 107834110 A | 3/2018 |
| EP | 2672561 A1 | 12/2013 |
| EP | 2696409 A2 | 2/2014 |
| EP | 3306732 A1 | 4/2018 |
| JP | 3393145 B2 | 4/2003 |
| JP | 2004111349 A | 4/2004 |
| JP | 2013051202 A | 3/2013 |
| JP | 2014517459 A | 7/2014 |
| JP | 2015111495 A | 6/2015 |
| JP | 2016167352 A | 9/2016 |
| JP | WO2016181952 A1 | 11/2016 |
| JP | 2016225294 A | 12/2016 |

OTHER PUBLICATIONS

The First Office Action for China Application No. 201811014430.3, dated Sep. 1, 2020, 10 pages.
The First Office Action for India Application No. 202117005712, dated Apr. 15, 2021, 6 pages.
The extended European search report for EP Application No. 19855763.9, dated Jun. 25, 2021, 9 pages.
Zhao Wei et al. Research progress of a new lithium salt lithium oxalyldifluoroborate. New chemical materials, vol. 41, No. 4, p. 21-23, dated Apr. 30, 2013.
The Second Office Action for China Application No. 201811014430.3, dated Nov. 9, 2020, 6 pages.

* cited by examiner

LITHIUM ION SECONDARY BATTERY

CROSS-REFERENCE TO RELATED APPLICATION

The present application is a National Stage of International Application No. PCT/CN2019/103218 filed on Aug. 29, 2019, which claims priority to Chinese Patent Application No. 201811014430.3, filed on Aug. 31, 2018, both of which is incorporated herein by reference in their entirety.

TECHNICAL FIELD

The present application relates to the field of battery technology, in particular to a lithium ion secondary battery.

BACKGROUND

Lithium-ion secondary batteries can provide stable voltage and current, have a high-voltage platform, high specific energy, and a wide temperature range, and are environmentally friendly and easy to carry, which have become a mainstream power source of various consumer electronics and electric products. Lithium ion secondary batteries with a ternary system positive active material have characteristics of large discharge capacity and high energy density, and thus are a very potential lithium ion secondary battery. However such lithium ion secondary batteries have a disadvantage of poor safety performance. As the application range of lithium ion secondary batteries becomes wider and wider, people have also put forward higher and higher requirements to safety performance of lithium ion secondary batteries. Therefore how to make lithium ion secondary batteries having a higher energy density while also keeping a higher safety performance has been becoming an urgent felt technical problem to be solved.

SUMMARY

The inventor has found that incorporation of lithium manganate into a ternary material may improve thermal stability, reduce high-temperature oxygen release, and reduce oxidation in a fully charged state of the ternary material, which may improve safety performance of batteries while keeping the batteries having a higher energy density. However, addition of lithium manganate may negatively affects cycle performance and high-temperature storage performance of batteries.

The inventor has conducted a lot of research to reduce the negative effects caused by incorporation of lithium manganate, so that batteries have a higher energy density, and also have a higher safety performance, cycle performance and high temperature storage performance.

Therefore, embodiments of the present application provide a lithium ion secondary battery including a positive electrode plate, a negative electrode plate, a separator and an electrolyte, wherein
the positive electrode plate includes a positive electrode current collector and a positive electrode film provided on at least one surface of the positive electrode current collector, and the positive electrode film includes a first positive electrode active material represented by chemical formula (1) and a second positive electrode active material represented by chemical formula (2),

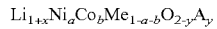  chemical formula (1)

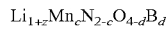  chemical formula (2)

in the chemical formula (1), $-0.1 \leq x \leq 0.2$, $0<a<1$, $0<b<1$, $0<a+b<1$, $0 \leq y<0.2$, Me includes one or more of Mn, Fe, Cr, Ti, Zn, V, Al, Zr and Ce, and A includes one or more of S, N, F, Cl, Br and I, in the chemical formula (2), $-0.1 \leq z \leq 0.2$, $0 \leq c \leq 2$, $0 \leq d<1$, N includes one or more of Ni, Fe, Cr, Ti, Zn, V, Al, Mg, Zr and Ce, and B includes one or more of S, N, F, Cl, Br and I;
the positive electrode plate has a resistivity r of 3500 Ω·m or less; and,
the electrolyte includes a fluorine-containing lithium salt type additive.

In the lithium ion secondary battery provided by the present application, the synergistic effect between the first positive electrode active material and the second positive electrode active material enables positive electrode active materials to have high gram capacity and high thermal stability both, which further significantly improves the problems of high-temperature oxygen release and strong oxidizing problem in the fully charged state of the first positive electrode active material, so that the batteries exhibit greatly improved safety performance while having a higher energy density. The synergistic effect may also reduce precipitation of metal ions such as manganese ions from positive active materials. At the same time, a fluorine-containing lithium salt type additive is added to the electrolyte to form a stable LiF passivation layer on the surface of positive electrode active materials, which can further improve structural stability and corrosion resistance of positive electrode active materials, and reduce precipitation of metal ions such as manganese ions. The protective effect of the LiF passivation layer also reduces the side reaction between positive electrode active materials and an electrolyte. As a result, safety performance of the lithium ion secondary battery is further improved, and high-temperature storage performance and cycle performance of the battery are also significantly improved. In addition, the positive electrode plate has a resistivity of 3500 Ω·m or less, which can effectively control increase in battery internal impedance caused by the second positive electrode active material and the LiF passivation layer, and further improve high-temperature storage performance and cycle performance of the battery.

Therefore, the lithium ion secondary battery according to embodiments of the present application can have high specific capacity and energy density, while keeping high safety performance, high temperature storage performance and cycle performance.

DETAILED DESCRIPTION

In order to make the purpose, technical solutions, and beneficial technical effects of the present application clearer, the present application will be further described in detail below in conjunction with embodiments. It should be understood that the embodiments described in the description are only for explaining the present application, and are not intended to limit the application.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

According to embodiment of the present application, a lithium ion secondary battery is provided, comprising a positive electrode plate, a negative electrode plate, a separator and electrolyte.

The positive electrode plate comprises a positive electrode current collector and a positive electrode film disposed on at least one surface of the positive electrode current collector. The positive electrode film comprises a positive electrode active material, which can reversibly deintercalate/intercalate lithium ions during working. The positive current collector is adapted to collect and conduct current.

As an example, the positive electrode current collector comprises two opposite surfaces in its thickness direction, and the positive electrode film is disposed on either or both of the two opposite surfaces of the positive electrode current collector.

Preferably, the positive electrode active material comprises a first positive electrode active material and a second positive electrode active material.

The first positive electrode active material is a compound represented by chemical formula (1),

$$Li_{1+x}Ni_aCo_bMe_{1-a-b}O_{2-y}A_y \quad \text{chemical formula (1)}$$

in which chemical formula (1), $-0.1 \leq x \leq 0.2$, $0 < a < 1$, $0 < b < 1$, $0 < a+b < 1$, $0 \leq y < 0.2$, Me comprises one or more of Mn, Fe, Cr, Ti, Zn, V, Al, Zr and Ce, and A comprises one or more of S, N, F, Cl, Br and I.

The second positive electrode active material is a compound represented by chemical formula (2)

$$Li_{1+z}Mn_cN_{2-c}O_{4-d}B_d \quad \text{chemical formula (2)}$$

in which chemical formula (2), $-0.1 \leq z \leq 0.2$, $0 < c \leq 2$, $0 \leq d < 1$, N comprises one or more of Ni, Fe, Cr, Ti, Zn, V, Al, Mg, Zr and Ce, and B comprises one or more of S, N, F, Cl, Br and I.

Further, the positive electrode plate has a resistivity r of 3500 Ω·m or less; and the electrolyte comprises a fluorine-containing lithium salt type additive.

In the lithium ion secondary battery provided by the present application, the synergistic effect between the first positive electrode active material and the second positive electrode active material enables the positive electrode active material to have high gram capacity and high thermal stability both, which further significantly improves problems of high-temperature oxygen release and strong oxidizing problem in the fully charged state of the first positive electrode active material, so that the batteries exhibit greatly improved safety performance while having a higher energy density. The synergistic effect may also reduce precipitation of metal ions such as manganese ions from the positive active material. At the same time, a fluorine-containing lithium salt type additive is added to the electrolyte to form a stable LiF passivation layer on the surface of the positive electrode active material, and to better protect the positive electrode active material. The protective effect of the LiF passivation layer can further improve structural stability and corrosion resistance of the positive electrode active material, and reduce precipitation of metal ions such as manganese ions from the positive electrode active material; and at the same time, also reduces the side reaction between the positive electrode active material and the electrolyte. As a result, safety performance of the lithium ion secondary battery is further improved, and high-temperature storage performance and cycle performance of the battery are also significantly improved. In addition, the positive electrode plate has a resistivity of 3500 Ω·m or less, which can effectively control increase in battery internal impedance caused by the second positive electrode active material and the LiF passivation layer, and further improve high-temperature storage performance and cycle performance of the battery.

Therefore, the lithium ion secondary battery according to embodiments of the present application can have high specific capacity and energy density, while keeping high safety performance, high temperature storage performance and cycle performance at the same time.

The lithium ion secondary battery according to embodiments of the present application may have higher high-temperature storage performance and high-temperature cycle performance, for example, from 40° C. to 80° C.

The lithium ion secondary battery according to embodiments of the present application may have a relatively high comprehensive electrochemical performance in a wide temperature range, for example, from −30° C. to 80° C.

Preferably, the positive electrode plate has a resistivity of 2500 Ω·m or less; more preferably, of 1200 Ω·m or less.

Preferably, in the chemical formula (1), $0.5 \leq a < 1$, $0 < b < 0.5$, $0.7 \leq a+b < 1$, $0 \leq y < 0.1$, M is one or both of Mn and Al, A is one or both of S and F. The first positive electrode active material has a higher nickel content and thus can enable battery to obtain higher specific capacity and energy density. In addition, the lithium ion secondary battery according to embodiments of the present application also comprises a second positive electrode active material, which enable lithium ion secondary battery comprising the first positive electrode active material to have higher safety performance, high-temperature storage performance and cycle performance.

Preferably, the weight ratio of the first positive electrode active material to the second positive electrode active material in a positive electrode active material is preferably 2:8-99.5:0.5. The above weight ratio of the first positive electrode active material to the second positive electrode active material is suitable, which is beneficial to improving safety performance, high-temperature storage performance and cycle performance of the lithium ion secondary battery.

In some embodiments, the positive electrode film comprises manganese element preferably in a weight v in the range of $1.1 \times 10^{-3}$ g/cm$^2$~$9.1 \times 10^{-3}$ g/cm$^2$ per unit area; more preferably the positive electrode film comprises manganese element preferably in a weight v in the range of $1.1 \times 10^{-3}$ g/cm$^2$~$8.2 \times 10^{-3}$ g/cm$^2$ per unit area. The above weight content of manganese in a positive electrode film is suitable, which is beneficial to improve safety performance, high temperature storage performance and cycle performance of the lithium ion secondary battery.

In addition, the positive electrode film may further comprises a conductive agent and a binder. There is no specific limit in the present application to the type of the conductive agent and binder in the positive electrode film, which can be selected according to actual demands.

As an example, the conductive agent may be one or more of graphite, superconducting carbon, acetylene black, carbon black, Ketjen black, carbon dots, carbon nanotubes, graphene, and carbon nanofibers; and the binder may be one or more of styrene butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA) and polyvinyl alcohol (PVA).

In some optional embodiments, the weight ratio of the conductive agent to the positive electrode active material is greater than or equal to 1.5:95.5, and the weight percentage of the binder in the positive electrode active material layer is less than or equal to 2 wt %. The content of conductive agent and binder in the positive electrode film is within above predetermined range, which is beneficial to fully cover the positive electrode active material by the conductive agent, so as to form a uniform and rapid electron transport network, thereby improving rate performance and cycle performance of the lithium ion secondary battery.

The positive electrode current collector can be a metal foil or a porous metal plate, for example, a foil or a porous plate made of metals such as aluminum, copper, nickel, titanium, or silver or their alloys, such as aluminum foil.

The positive electrode plate can be prepared by coating. For example, the positive electrode plate is prepared by first mixing a positive electrode active material, a binder, a conductive agent and an organic solvent in a predetermined ratio in which the solvent can be N-methylpyrrolidone (NMP), and stirring the mixture uniformly, thereby obtaining a positive electrode slurry; then coating the positive slurry on a positive electrode current collector, followed by the processes of drying and rolling. In above process, the positive electrode active material comprises the aforementioned first positive electrode active material and the aforementioned second positive electrode active material.

In some embodiments, the first positive electrode active material and the second positive electrode active material are added at the same time, in which a lower electrode plate resistivity is obtained by adjusting the stirring process. As a specific example, the first positive electrode active material, the second positive electrode active material, the conductive agent, the binder, and the solvent are added to a vacuum mixer under stirring to obtain a homogenous mixture. The stirring rate can be 800 r/min~1600 r/min, preferably 1000 r/min~1200 r/min. The stirring time can be 60 min~180 min, preferably 90 min~150 min. Such a process can achieve a lower electrode plate resistivity and improve uniformity of electron transmission network.

Alternatively, in other embodiments, the first positive active material and the second positive active material may be added in order. As a specific example, the process is carried out by first adding the first positive electrode active material, the binder, the conductive agent, and the organic solvent, for example, in a vacuum mixer, under stirring to obtain a stable pre-slurry in which the stirring rate is 800 r/min~1600 r/min, such as 1000 r/min~1200 r/min, and the stirring time is 60 min~180 min, such as 90 min~150 min; then adding a predetermined amount of the second positive electrode active material to the pre-slurry in a vacuum mixer under stirring to form a positive electrode slurry in which the stirring rate is 800 r/min~1600 r/min, such as 1000 r/min~1200 r/min, and the stirring time is 60 min~180 min, such as 90 min~150 min. Such a process is more conducive to reducing resistivity of positive electrode plate and improving uniformity of electron transport network.

The negative electrode plate may comprise a negative electrode current collector and a negative electrode film provided on at least one surface of the negative electrode current collector. Specifically, the negative electrode current collector comprises two opposite surfaces in its thickness direction, and the negative electrode film is disposed on either or both of the two opposite surfaces of the negative electrode current collector. The negative electrode film comprises a negative electrode active material, which can reversibly deintercalate/intercalate lithium ions during working. The negative current collector is adapted to collect and conduct current.

There is no specific limit in the present application to the type of negative active material, which can be selected according to actual demands. As an example, the negative electrode active material may be one or more of natural graphite, artificial graphite, mesophase micro-carbon bead (MCMB), hard carbon, soft carbon, silicon, silicon-carbon composite, SiO, Li—Sn alloy, Li—Sn—O alloy, Sn, SnO, $SnO_2$, lithium titanate $Li_4Ti_5O_{12}$ with a spinel structure, Li—Al alloy and metal lithium.

If necessary, the negative electrode film may further include a conductive agent and a binder. There is no specific limit in the present application to the type of the conductive agent and binder in the negative electrode film, which can be selected according to actual demands. As an example, the conductive agent may be one or more of graphite, superconducting carbon, acetylene black, carbon black, Ketjen black, carbon dots, carbon nanotubes, graphene, and carbon nanofibers; and the binder may be one or more of styrene butadiene rubber (SBR), polyvinylidene fluoride (PVDF), polytetrafluoroethylene (PTFE), polyvinyl butyral (PVB), water-based acrylic resin, and carboxymethyl cellulose (CMC).

The negative electrode film may optionally comprise a thickener, such as carboxymethyl cellulose (CMC).

The negative electrode current collector can be a metal foil or a porous metal plate, for example, a foil or a porous plate made of metals such as copper, nickel, titanium, or iron or their alloys, such as copper foil.

The negative electrode plate can be prepared according to a conventional process in the art. Usually, the negative electrode plate is prepared by dispersing the negative electrode active material and optionally the conductive agent, the binder, and the thickener in a solvent in which the solvent can be N-methylpyrrolidone (NMP) or deionized water, to form a homogenous negative slurry; then coating the negative slurry on a negative electrode current collector, followed by the processes of drying and cold-pressing.

In other embodiments, the negative electrode plate may be a metal lithium plate.

There is no specific limit in the present application to the separator of the lithium ion secondary battery, which can be any known porous structural separator with electrochemical and chemical stability. For example, the separator is a mono-layer or multi-layer film selected from one or more of glass fiber, non-woven fabric, polyethylene (PE), polypropylene (PP), and polyvinylidene fluoride (PVDF).

In the lithium ion secondary battery of the present application, the electrolyte may comprise an organic solvent, an electrolyte lithium salt, and additives. There is no specific limit in the present application to the types of organic solvents and electrolyte lithium salts, which can be selected according to actual needs.

As an example, the organic solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB) and ethyl butyrate (EB), such as one or more of ethylene carbonate (EC), ethyl methyl carbonate (EMC), diethyl carbonate (DEC), dimethyl carbonate (DMC), methyl formate (MF), methyl acetate (MA), ethyl acetate (EA), propyl acetate (PA), methyl propionate (MP), ethyl propionate (EP), propyl propionate (PP), methyl butyrate (MB), preferably two or more of the above listed substances.

As an example, the electrolyte lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium fluorooxalate phosphate) and LiTFOP (lithium tetrafluorooxalate phosphate), such as one or more $LiPF_6$ (lithium hexafluorophosphate), $LiBF_4$ (lithium tetrafluoroborate), LiBOB (lithium bisoxalate borate), LiDFOB (lithium difluorooxalate borate), LiTFSI (lithium bistrifluoromethanesulfonimide) and LiFSI (lithium bisfluorosulfonimide).

The additives may comprise fluorine-containing lithium salt type additives. Preferably, the fluorine-containing lithium salt type additive is one or more of a compound represented by chemical formula (3) and a compound represented by chemical formula (4).

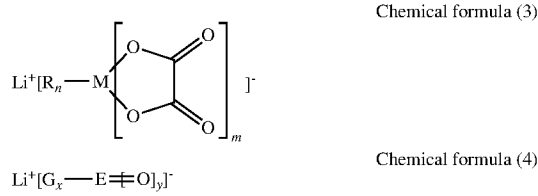

Chemical formula (3)

Chemical formula (4)

in the chemical formula (3), R is one or more of F, Cl, Br and I, and R comprises F, M is P or B, when M is P, n+2m=6, and m is 1 or 2, and when M is B, n+2m=4, and m is 0 or 1;

in the chemical formula (4), G is one or more of F, Cl, Br and I, and G comprises F, E is P or B, when E is P, x+2y=6, and y is 1 or 2, and when E is B, x+2y=4, and y is 0 or 1.

Using one or more of the compound represented by the chemical formula (3) and the compound represented by the chemical formula (4) as fluorine-containing lithium salt type additives can form a stable LiF passivation layer on the surface of the positive electrode active material. The LiF passivation layer can alleviate structural degradation of the positive electrode active material caused by John-Teller effect, and reduce corrosion of the positive electrode by acidic substances in the electrolyte, so that the structure of the positive electrode active material is more stable, and precipitation of metal ions such as manganese is significantly reduced. The LiF passivation layer can also reduce side reaction between the positive electrode active material and the electrolyte. As a result, high-temperature storage performance and cycle performance of the lithium ion secondary battery are further improved.

Further preferably, the fluorine-containing lithium salt type additive is one or more of $LiPO_2F_2$ (lithium difluorophosphate), LiDFOP (lithium difluorooxalate phosphate), $LiBF_4$, (lithium tetrafluoroborate) and LiDFOB (lithium difluorooxalate borate). Such fluorine-containing lithium salt type additive can better improve the high-temperature storage performance and cycle performance of the lithium ion secondary battery.

Preferably, the fluorine-containing lithium salt type additive is present in the electrolyte in a weight percentage u of 0.005 wt %~3 wt %, preferably 0.1 wt %~2 wt %.

Preferably, the positive electrode plate and the electrolyte satisfy the following formula (11)

$$0.005 \leq \frac{u}{100v} \leq 27.5 \quad \text{formula (11)}$$

in which v is the weight of manganese element contained in the positive electrode film per unit area, in $g/cm^2$; and u is the weight percentage of the fluorine-containing lithium salt type additive in the electrolyte, in wt %.

Making the positive electrode plate and the electrolyte satisfy the formula (11) can further improve high temperature storage performance and cycle performance of the lithium ion secondary battery.

More preferably the positive electrode plate and the electrolyte satisfy the following formula (12)

$$0.01 \leq \frac{u}{100v} \leq 20.0 \quad \text{formula (12)}$$

It is understood that the compound represented by the above chemical formula (3) and the compound represented by the chemical formula (4) can be used as both fluorine-containing lithium salt type additives and electrolyte lithium salts, as long as the fluorine-containing lithium salt type additive is guaranteed to meet the preset amount, i.e. the amount is sufficient to ensure effective passivation between the positive electrode plate and the electrolyte.

In order to better improve high-temperature storage performance and cycle performance of the battery, a negative electrode film-forming enhancer is further contained in the electrolyte. Preferably, the negative electrode film-forming enhancer is one or more of cyclic carbonates with unsaturated bonds in side chains, fluorine-containing cyclic carbonates and cyclic sulfonates. The negative electrode film-forming enhancer can improve rigidity of the negative electrode interface film and prevent damage to the negative electrode interface film caused by addition of fluorine-containing lithium salt type additives, thereby better protecting the negative electrode. Adding a negative electrode film-forming enhancer to the electrolyte may enable the lithium ion secondary battery to have higher high-temperature storage performance and cycle performance; which can further inhibit gas production and improve safety performance of the battery at the same time.

More preferably, the negative electrode film-forming enhancer is one or more of Vinyl Ethylene Carbonate (VEC), Methylene Methanedisulfonate (MMDS), Difluoro Ethylene Carbonate (DFEC), Trifluoromethyl Ethylene Carbonate (TFPC) and 1-propene-1,3-sultone (PST). The negative electrode film-forming enhancer can further improve high-temperature storage performance and cycle performance of the lithium ion secondary battery.

Preferably, the weight percentage of the negative electrode film-forming enhancer in the electrolyte is 0.005 wt %-6 wt %. Further preferably, the weight percentage of the negative electrode film-forming enhancer in the electrolyte is 0.01 wt % to 5 wt %. More preferably, the weight percentage of the negative electrode film-forming enhancer in the electrolyte is 0.1 wt % to 2 wt %.

The electrolyte may optionally contain other additives, such as one or more of ethylene carbonate (VC), fluoroethylene carbonate (FEC), ethylene sulfate (DTD), succinonitrile (SN), adiponitrile (ADN), cyclic quaternary ammonium salt of sulfonate, tris(trimethylsilyl) phosphate (TMSP) and tris(trimethylsilyl) borate (TMSB).

Preferably, the positive electrode plate and the electrolyte satisfy the following formula (21), $$-1.21 \leq \ln r - s_1 \leq 2 \qquad \text{formula (21)}$$

in which, r is the resistivity of the positive electrode plate in $\Omega \cdot m$; and $s_1$ is the ionic conductivity of the electrolyte at 25° C. in mS/cm.

Making the positive electrode plate and the electrolyte satisfy the formula (21) can further improve high temperature storage performance and cycle performance of the lithium ion secondary battery.

More preferably, the positive electrode plate and the electrolyte satisfy the following formula (22), $$-0.5 \leq \ln r - s_1 \leq 1.5 \qquad \text{formula (22)}$$

In some embodiments, the electrolyte has an ionic conductivity of preferably 6.0 mS/cm or more, more preferably 7.6 mS/cm or more, and more preferably 8.0 mS/cm or more.

Preferably, the organic solvent with a viscosity of less than or equal to 0.7 mPa·s is present in the electrolyte in a weight percentage of 40 wt % to 80 wt %, which enables the electrolyte to have both a lower viscosity and a higher dielectric constant.

The electrolyte may be prepared according to conventional processes in the art. The organic solvent, electrolyte lithium salt and additives can be mixed uniformly to obtain an electrolyte. There is no particularly limit in the present application to addition order of each material. For example, the electrolyte may be obtained by adding the electrolyte lithium salt and additives to the organic solvent and mixing them uniformly. Alternatively, the electrolyte may be obtained by adding the electrolyte lithium salt to the organic solvent first, and then adding the additives to the organic solvent.

The positive electrode plate, the separator and the negative electrode plate are stacked in order, so that the separator was sandwiched in between the positive electrode plate and the negative electrode plate, and then the stack is used a battery core or may be wound into a battery core; the battery core is placed in a packaging shell in which the electrolyte is injected and then sealed to obtain a lithium ion secondary battery.

EXAMPLES

The disclosure in the present application will be described in further detail with reference to the following examples. However, it is to be understood that the following examples of the present application are only intended to be illustrative of the present invention, and are not intended to limit the invention, because it would be obvious to those skilled in the art that various modifications and changes can be made within the scope of the disclosure of the present application. Unless otherwise stated, all parts, percentages, and ratios reported in the following examples are based on weight, and all reagents used in the examples are commercially available or synthesized by conventional methods, and can be directly obtained without further treatment, and the instruments used in the examples are commercially available.

Example 1

Preparation of Positive Electrode Plate

A positive electrode plate was prepared as follows: $LiNi_{0.8}Co_{0.1}Mn_{0.1}O_2$ as a first positive active material, $LiMn_2O_4$ as a second positive active material were mixed homogenously at a weight ratio η of 65:35, and the combined positive electrode active material, conductive carbon black and PVDF as a binder were dispersed at a weight ratio of 96:2:2 in NMP and mixed homogenously for 60 minutes, to form a mixture slurry. And then the positive electrode slurry was coated on the surface of a positive current collector in the form of aluminum foil, followed by drying, cold-pressing, slitting and cutting, thereby obtaining the positive electrode plate.

Preparation of Negative Electrode Plate

A negative electrode plate was prepared as follows: graphite as a negative electrode active material, conductive carbon black SP, CMC as a thickener and SBR as a binder were dispersed at a weight ratio of 96:1:1:2 in deionized water and mixed homogeneously to obtain a negative slurry. And then the negative slurry was coated on the surface of a negative current collector in the form of copper foil, followed by drying, cold-pressing, slitting and cutting, thereby obtaining the negative electrode plate.

Preparation of Electrolyte

Ethylene carbonate (EC), ethyl methyl carbonate (EMC), and diethyl carbonate (DEC) were mixed to obtain an organic solvent. 1 mol/L of $LiPF_6$ was dissolved in the above resulting organic solvent to which 0.1 wt % of $LiPO_2F_2$ as a fluorine-containing lithium salt type additive based on the total weight of the electrolyte was added and mixed uniformly, thereby obtaining an electrolyte.

Preparation of Lithium Ion Secondary Battery

PP/PE/PP was used as a separator, and the positive electrode plate, the separator and the negative electrode plate were stacked in order in which the separator was sandwiched in between the positive electrode plate and the negative electrode plate for separation, and then the stack was wound into a battery core. The battery core was put into a soft case followed by sealing at the top side and infusing with the electrolyte, thereby forming a soft case battery.

Example 2

Example 2 was prepared in the same procedure as Example 1 except that in the preparation of positive electrode plate, $LiNi_{0.8}Co_{0.1}Mn_{0.1}O_2$ as a first positive active material, conductive carbon black, PVDF as a binder and NMP as a solvent were mixed and beaten, thereby forming a stable pre-slurry; to the pre-slurry, $LiMn_2O_4$ as a second positive active material was added to form a mixture and the mixture was stirred and mixed uniformly in which the stirring time is 60 minutes, thereby obtaining a positive electrode slurry; the positive electrode slurry was coated on the surface of a positive current collector in the form of aluminum foil, followed by drying, cold-pressing, slitting and cutting, thereby obtaining the positive electrode plate wherein the weight ratio η of $LiNi_{0.8}Co_{0.1}Mn_{0.1}O_2$ as a first positive active material and $LiMn_2O_4$ as a second positive active material was 65:35 and the weight ratio of the total positive electrode active materials, the conductive carbon black, and PVDF was 96:2:2.

Example 3

Example 2 was prepared with the same procedure as in Example 2 except that in the preparation of the positive electrode plate, the stirring time for mixing the mixture was 100 minutes.

Example 4

Example 4 was prepared with the same procedure as in example 2 except that in the preparation of the positive electrode plate, the stirring time for mixing the mixture was 150 minutes.

Examples 5-35

Examples 5-35 were prepared with the same procedure as in example 2 except that the relevant parameters of the preparation steps for the positive electrode plate and of the preparation steps for the electrolyte were adjusted. Detailed parameters were summarized in table 1.

Comparative Example 1

Comparative Example 1 was prepared with the same procedure as in example 1 except that in the preparation of positive electrode plate, $LiNi_{0.8}Co_{0.1}Mn_{0.1}O_2$ as a positive active material, conductive carbon black, PVDF as a binder and NMP as a solvent were mixed uniformly, thereby forming a positive electrode slurry; the positive electrode slurry was coated on the surface of a positive current collector in the form of aluminum foil, followed by drying, cold-pressing, slitting and cutting, thereby obtaining the positive electrode plate wherein the weight ratio of the positive active material of $LiNi_{0.8}Co_{0.1}Mn_{0.1}O_2$, the conductive carbon black, and PVDF was 96:2:2.

Comparative Example 2

Comparative Example 2 was prepared with the same procedure as in example 1 except that in the preparation of positive electrode plate, $LiMn_2O_4$ as a positive active material, conductive carbon black, PVDF as a binder and NMP as a solvent were mixed uniformly, thereby forming a positive electrode slurry; the positive electrode slurry was coated on the surface of a positive current collector in the form of aluminum foil, followed by drying, cold-pressing, slitting and cutting, thereby obtaining the positive electrode plate wherein the positive active material $LiMn_2O_4$, the conductive carbon black, and PVDF were present at a weight ratio of 96:2:2.

Comparative Example 3

Comparative Example 3 was prepared with the same procedure as in example 1 except that in the preparation of the positive electrode plate, the stirring time for mixing the mixture was 50 minutes.

Comparative Examples 4-5

Comparative examples 4-5 were prepared with the same procedure as in example 2 except that the relevant parameters of the preparation steps for the electrolyte were adjusted. Detailed parameters were summarized in table 1.

Test Method (1) Resistivity Test for Positive Electrode Plate

Resistance R of a positive electrode plate was measured with Hioki BT3562 internal resistance tester, comprising the steps of: cutting a test sample with a size of 10 cm×10 cm from a positive electrode plate; clamping the upper and lower sides of the test sample on the two conductive terminals of the internal resistance tester, applying a certain pressure for fixture, and testing the resistance R of the positive electrode plate wherein the diameter of the conductive terminal was 14 mm, the applied pressure was 15 MPa~27 MPa, and the sampling time range is 5 s~17 s.

Resistivity r of the positive electrode plate was calculated according to the formula r=R·s/l, where s was the detection area, and in this test the detection area was equal to the area of the above-mentioned conductive terminal; l is the thickness of the test sample, i.e. the thickness of the positive electrode plate.

(2) High-Temperature Cycle Performance Test for Lithium Ion Secondary Batteries

At 45° C., the fresh lithium ion secondary batteries were left for 5 minutes, charged at a constant current of 1 C to 4.2V, and then charged at a constant voltage until the current was less than or equal to 0.05 C. After that, the charged batteries were left for 5 minutes and then discharged at a constant current of 1 C to 3.0V. This is a charge and discharge cycle. The resulting discharge capacity was recorded as the discharge capacity for the first cycle. These lithium ion secondary batteries were subjected to a 400-cycle charge-discharge test following the procedure described above, and the discharge capacity for each cycle was recorded.

Capacity retention (%) of lithium ion secondary battery after 400 cycles of 1 C/1 C at 45° C.=the discharge capacity after the 400th cycle/the discharge capacity after the first cycle x 100%.

(3) High Temperature Storage Performance Test for Lithium Ion Secondary Battery

At 25° C., the fresh lithium ion secondary batteries were left for 5 minutes, charged at a constant current of 1 C to 4.2V, and then charged at a constant voltage until the current was less than or equal to 0.05 C. After that, the charged batteries were left for 5 minutes and then discharged at a constant current of 1 C to 3.0V. The resulting discharge capacity was recorded as the initial discharge capacity.

At 25° C., the fresh lithium ion secondary batteries were left for 5 minutes, charged at a constant current of 1 C to 4.2V, and then charged at a constant voltage until the current was less than or equal to 0.05 C. After that, the charged batteries were left for 5 minutes and then the lithium ion secondary batteries in the fully charged state were stored in an oven at 60° C. for 60 days.

After the high-temperature storage for 60 days, the lithium ion secondary batteries were removed from the oven and then naturally cooled down to 25° C. The cooled lithium ion secondary batteries were charged at a constant current of 1 C to 4.2V, and then charged at a constant voltage until the current was less than or equal to 0.05 C. After that, the charged batteries were left for 5 minutes and then discharged at a constant current of 1 C to 3.0V. The resulting discharge capacity was recorded as the discharge capacity after high-temperature storage for 60 days.

Capacity retention (%) of lithium ion secondary battery after high temperature storage for 60 days=the discharge capacity after high temperature storage for 60 days/the initial discharge capacity×100%.

(4) Needle Puncture Performance Test for Lithium Ion Secondary Battery

At 25° C., the fresh lithium ion secondary batteries were left for 5 minutes, charged at a constant current of 1 C to 4.2V, and then charged at a constant voltage until the current was less than or equal to 0.05 C. After that, the lithium ion secondary battery was pierced through with a 5 mm diameter nail at a speed of 10 mm/s and the maximum surface temperature and phenomenon of the lithium ion secondary battery were monitored.

Test results of Examples and Comparative Examples were summarized in table 2.

TABLE 1

| | Positive Electrode plate | | | | Electrolyte | | | |
| | | | | | F-containing lithium salt additive | | Negative electrode film-forming enhancer | | conductivity $s_1$ |
| | First positive active material/ second positive active material | Weight ratio $\eta$ | Mn content v/g·m$^{-2}$ | Resistivity r/ Ω·m | | Content u/ wt % | Type | Content/ wt % | mS/cm at 25° C. |
|---|---|---|---|---|---|---|---|---|---|
| Ex.1 | LiNi$_{0.8}$Co$_{0.1}$Mn$_{0.1}$O$_2$/LiMn$_2$O$_4$ | 65:35 | 4.55 × 10$^{-3}$ | 3489 | LiPO$_2$F$_2$ | 0.1 | / | / | 8.16 |
| Ex.2 | LiNi$_{0.8}$Co$_{0.1}$Mn$_{0.1}$O$_2$/LiMn$_2$O$_4$ | 65:35 | 4.55 × 10$^{-3}$ | 2891 | LiPO$_2$F$_2$ | 0.1 | / | / | 7.97 |
| Ex.3 | LiNi$_{0.8}$Co$_{0.1}$Mn$_{0.1}$O$_2$/LiMn$_2$O$_4$ | 65:35 | 4.55 × 10$^{-3}$ | 2502 | LiPO$_2$F$_2$ | 0.1 | / | / | 7.82 |
| Ex.4 | LiNi$_{0.8}$Co$_{0.1}$Mn$_{0.1}$O$_2$/LiMn$_2$O$_4$ | 65:35 | 4.55 × 10$^{-3}$ | 1198 | LiPO$_2$F$_2$ | 0.1 | / | / | 7.09 |
| Ex.5 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 7.89 |
| Ex.6 | LiNi$_{0.8}$Co$_{0.1}$Mn$_{0.1}$O$_2$/LiMn$_2$O$_4$ | 65:35 | 4.55 × 10$^{-3}$ | 2891 | LiBF$_4$ | 0.1 | / | / | 7.81 |
| Ex.7 | LiNi$_{0.8}$Co$_{0.1}$Mn$_{0.1}$O$_2$/LiMn$_2$O$_4$ | 65:35 | 4.55 × 10$^{-3}$ | 2891 | LiDFOB | 0.1 | / | / | 8.22 |
| Ex.8 | LiNi$_{0.8}$Co$_{0.1}$Mn$_{0.1}$O$_2$/LiMn$_2$O$_4$ | 28.8:71.2 | 8.20 × 10$^{-3}$ | 2915 | LiDFOB | 0.005 | / | / | 8.07 |
| Ex.9 | LiNi$_{0.8}$Co$_{0.1}$Mn$_{0.1}$O$_2$/LiMn$_2$O$_4$ | 28.8:71.2 | 8.20 × 10$^{-3}$ | 2915 | LiDFOB | 0.01 | / | / | 7.81 |
| Ex.10 | LiNi$_{0.8}$Co$_{0.1}$Mn$_{0.1}$O$_2$/LiMn$_2$O$_4$ | 28.8:71.2 | 8.20 × 10$^{-3}$ | 2915 | LiDFOB | 0.1 | / | / | 8.14 |
| Ex.11 | LiNi$_{0.8}$Co$_{0.1}$Mn$_{0.1}$O$_2$/LiMn$_2$O$_4$ | 99.5:0.5 | 1.10 × 10$^{-3}$ | 2678 | LiDFOB | 0.1 | / | / | 8.05 |
| Ex.12 | LiNi$_{0.8}$Co$_{0.1}$Mn$_{0.1}$O$_2$/LiMn$_2$O$_4$ | 28.8:71.2 | 8.20 × 10$^{-3}$ | 2915 | LiDFOP | 3.0 | / | / | 7.97 |
| Ex.13 | LiNi$_{0.8}$Co$_{0.1}$Mn$_{0.1}$O$_2$/LiMn$_2$O$_4$ | 99.5:0.5 | 1.10 × 10$^{-3}$ | 2678 | LiDFOP | 1.0 | / | / | 8.13 |
| Ex.14 | LiNi$_{0.8}$Co$_{0.1}$Mn$_{0.1}$O$_2$/LiMn$_2$O$_4$ | 99.5:0.5 | 1.10 × 10$^{-3}$ | 2678 | LiDFOB | 2.0 | / | / | 7.81 |
| Ex.15 | LiNi$_{0.8}$Co$_{0.1}$Mn$_{0.1}$O$_2$/LiMn$_2$O$_4$ | 99.5:0.5 | 1.10 × 10$^{-3}$ | 2678 | LiDFOB | 3.0 | / | / | 7.81 |
| Ex.16 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 9.03 |
| Ex.17 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 8.43 |
| Ex.18 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 6.47 |
| Ex.19 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 6.2 |
| Ex.20 | LiNi$_{0.8}$Co$_{0.1}$Mn$_{0.1}$O$_2$/LiMn$_2$O$_4$ | 65:35 | 4.55 × 10$^{-3}$ | 2891 | LiDFOP | 0.1 | / | / | 6.13 |
| Ex.21 | LiNi$_{0.8}$Co$_{0.1}$Mn$_{0.1}$O$_2$/LiMn$_2$O$_4$ | 20:80 | 9.08 × 10$^{-3}$ | 2800 | LiDFOB | 0.15 | / | / | 7.86 |
| Ex.22 | LiNi$_{0.8}$Co$_{0.1}$Mn$_{0.1}$O$_2$/LiMn$_2$O$_4$ | 65:35 | 4.55 × 10$^{-3}$ | 2891 | LiDFOB | 0.1 | VEC | 0.005 | 7.97 |
| Ex.23 | LiNi$_{0.8}$Co$_{0.1}$Mn$_{0.1}$O$_2$/LiMn$_2$O$_4$ | 65:35 | 4.55 × 10$^{-3}$ | 2891 | LiDFOB | 0.1 | VEC | 0.01 | 7.97 |
| Ex.24 | LiNi$_{0.8}$Co$_{0.1}$Mn$_{0.1}$O$_2$/LiMn$_2$O$_4$ | 65:35 | 4.55 × 10$^{-3}$ | 2891 | LiDFOB | 0.1 | VEC | 0.1 | 7.97 |
| Ex.25 | LiNi$_{0.8}$Co$_{0.1}$Mn$_{0.1}$O$_2$/LiMn$_2$O$_4$ | 65:35 | 4.55 × 10$^{-3}$ | 2891 | LiPO$_2$F$_2$ | 0.1 | VEC | 0.2 | 7.97 |
| Ex.26 | LiNi$_{0.8}$Co$_{0.1}$Mn$_{0.1}$O$_2$/LiMn$_2$O$_4$ | 65:35 | 4.55 × 10$^{-3}$ | 2891 | LiDFOB | 0.1 | VEC | 2 | 7.97 |

TABLE 1-continued

| | Positive Electrode plate | | | | Electrolyte | | | | |
| --- | --- | --- | --- | --- | --- | --- | --- | --- | --- |
| | | | | | F-containing lithium salt additive | | Negative electrode film-forming enhancer | | conductivity |
| | First positive active material/ second positive active material | Weight ratio $\eta$ | Mn content v/g·m$^{-2}$ | Resistivity r/ $\Omega$·m | | Content u/ wt % | Type | Content/ wt % | $s_1$ mS/cm at 25° C. |
| Ex.27 | LiNi$_{0.8}$Co$_{0.1}$Mn$_{0.1}$O$_2$/ LiMn$_2$O$_4$ | 65:35 | 4.55 × 10$^{-3}$ | 2891 | LiDFOB | 0.1 | VEC | 5 | 7.97 |
| Ex.28 | LiNi$_{0.8}$Co$_{0.1}$Mn$_{0.1}$O$_2$/ LiMn$_2$O$_4$ | 65:35 | 4.55 × 10$^{-3}$ | 2891 | LiDFOB | 0.1 | VEC | 6 | 7.97 |
| Ex.29 | LiNi$_{0.8}$Co$_{0.1}$Mn$_{0.1}$O$_2$/ LiMn$_2$O$_4$ | 65:35 | 4.55 × 10$^{-3}$ | 2891 | LiPO$_2$F$_2$ | 0.1 | MMDS | 0.2 | 8.05 |
| Ex.30 | LiNi$_{0.8}$Co$_{0.1}$Mn$_{0.1}$O$_2$/ LiMn$_2$O$_4$ | 65:35 | 4.55 × 10$^{-3}$ | 2891 | LiPO$_2$F$_2$ | 0.1 | DFEC | 0.2 | 7.97 |
| Ex.31 | LiNi$_{0.8}$Co$_{0.1}$Mn$_{0.1}$O$_2$/ LiMn$_2$O$_4$ | 65:35 | 4.55 × 10$^{-3}$ | 2891 | LiPO$_2$F$_2$ | 0.1 | TFPC | 0.2 | 7.89 |
| Ex.32 | LiNi$_{0.8}$Co$_{0.1}$Mn$_{0.1}$O$_2$/ LiMn$_2$O$_4$ | 65:35 | 4.55 × 10$^{-3}$ | 2891 | LiPO$_2$F$_2$ | 0.1 | PST | 0.2 | 8.05 |
| Ex.33 | LiNi$_{0.6}$Co$_{0.2}$Mn$_{0.3}$O$_2$/ LiMn$_2$O$_4$ | 72.5:27.5 | 4.55 × 10$^{-3}$ | 2891 | LiPO$_2$F$_2$ | 0.1 | / | / | 7.97 |
| Ex.34 | LiNi$_{0.5}$Co$_{0.2}$Mn$_{0.3}$O$_2$/ LiMn$_2$O$_4$ | 82:18 | 4.55 × 10$^{-3}$ | 2891 | LiPO$_2$F$_2$ | 0.1 | / | / | 7.97 |
| Ex.35 | LiNi$_{1/3}$Co$_{1/3}$Mn$_{1/3}$O$_2$/ LiMn$_2$O$_4$ | 85.8:14.2 | 4.55 × 10$^{-3}$ | 2891 | LiPO$_2$F$_2$ | 0.1 | / | / | 7.97 |
| CEx.1 | LiNi$_{0.8}$Co$_{0.1}$Mn$_{0.1}$O$_2$ | / | 1.06 × 10$^{-3}$ | 2715 | LiDFOB | 0.1 | / | / | 7.99 |
| CEx.2 | LiMn$_2$O$_4$ | / | 10.96 × 10$^{-3}$ | 3132 | LiDFOB | 0.1 | / | / | 7.99 |
| CEx.3 | LiNi$_{0.8}$Co$_{0.1}$Mn$_{0.1}$O$_2$/ LiMn$_2$O$_4$ | 65:35 | 4.55 × 10$^{-3}$ | 3980 | LiPO$_2$F$_2$ | 0.1 | / | / | 7.97 |
| CEx.4 | LiNi$_{0.8}$Co$_{0.1}$Mn$_{0.1}$O$_2$/ LiMn$_2$O$_4$ | 65:35 | 4.55 × 10$^{-3}$ | 2891 | / | / | / | / | 7.81 |
| CEx.5 | LiNi$_{0.8}$Co$_{0.1}$Mn$_{0.1}$O$_2$/ LiMn$_2$O$_4$ | 65:35 | 4.55 × 10$^{-3}$ | 2891 | / | / | VEC | 0.2 | 7.81 |

TABLE 2

| | | | Needle puncture test | | Capacity retention (%) | |
| --- | --- | --- | --- | --- | --- | --- |
| | u/ 100 v | ln r·$s_1$ | phenomenon | Max. surface temperature/ ° C. | after 400 cycles of 1 C/1 C at 45° C. | Capacity retention (%) at 60° C. for 60 d |
| Ex.1 | 0.220 | 0.00 | No smoke and no open flame | 181.8 | 87.0 | 90.2 |
| Ex.2 | 0.220 | 0.00 | No smoke and no open flame | 183.5 | 87.0 | 90.0 |
| Ex.3 | 0.220 | 0.00 | No smoke and no open flame | 185.2 | 89.8 | 92.8 |
| Ex.4 | 0.220 | 0.00 | No smoke and no open flame | 183.5 | 93.0 | 95.9 |
| Ex.5 | 0.220 | 0.08 | No smoke and no open flame | 178.6 | 87.0 | 89.9 |
| Ex.6 | 0.220 | 0.16 | No smoke and no open flame | 186.2 | 87.0 | 90.2 |
| Ex.7 | 0.220 | −0.25 | No smoke and no open flame | 181.4 | 87.0 | 90.1 |
| Ex.8 | 0.006 | −0.09 | No smoke and no open flame | 186.2 | 83.8 | 86.8 |
| Ex.9 | 0.012 | 0.17 | No smoke and no open flame | 184.2 | 87.0 | 90.1 |
| Ex.10 | 0.122 | −0.16 | No smoke and no open flame | 175.4 | 87.0 | 89.9 |
| Ex.11 | 0.909 | −0.16 | No smoke and no open flame | 191.7 | 86.9 | 90.0 |
| Ex.12 | 3.659 | 0.01 | No smoke and no open flame | 184.3 | 87.0 | 89.9 |
| Ex.13 | 9.091 | −0.24 | No smoke and no open flame | 186.2 | 86.9 | 89.9 |
| Ex.14 | 18.182 | 0.08 | No smoke and no open flame | 183.2 | 87.0 | 89.9 |

TABLE 2-continued

|  | u/100 v | lnr-s$_1$ | Needle puncture test phenomenon | Max. surface temperature/ °C. | Capacity retention (%) after 400 cycles of 1 C/1 C at 45° C. | Capacity retention (%) at 60° C. for 60 d |
|---|---|---|---|---|---|---|
| Ex.15 | 27.273 | 0.08 | No smoke and no open flame | 183.2 | 84.1 | 87.0 |
| Ex.16 | 0.220 | −1.06 | No smoke and no open flame | 186 | 83.9 | 87.0 |
| Ex.17 | 0.220 | −0.46 | No smoke and no open flame | 186.1 | 86.9 | 89.9 |
| Ex.18 | 0.220 | 1.5 | No smoke and no open flame | 185.8 | 86.8 | 90.1 |
| Ex.19 | 0.220 | 1.77 | No smoke and no open flame | 182.1 | 84.1 | 87.0 |
| Ex.20 | 0.220 | 1.84 | No smoke and no open flame | 181.9 | 83.9 | 86.9 |
| Ex.21 | 0.165 | 0.08 | No smoke and no open flame | 173.5 | 83.9 | 86.9 |
| Ex.22 | 0.220 | 0.00 | No smoke and no open flame | 184.5 | 87.9 | 90.7 |
| Ex.23 | 0.220 | 0.00 | No smoke and no open flame | 182.9 | 90.1 | 93.0 |
| Ex.24 | 0.220 | 0.00 | No smoke and no open flame | 181.4 | 93.0 | 95.9 |
| Ex.25 | 0.220 | 0.00 | No smoke and no open flame | 183.5 | 92.9 | 96.0 |
| Ex.26 | 0.220 | 0.00 | No smoke and no open flame | 182.8 | 93.2 | 96.0 |
| Ex.27 | 0.220 | 0.00 | No smoke and no open flame | 183.8 | 89.9 | 93.1 |
| Ex.28 | 0.220 | 0.00 | No smoke and no open flame | 182.6 | 88.2 | 91.0 |
| Ex.29 | 0.220 | −0.08 | No smoke and no open flame | 182 | 93.1 | 96.1 |
| Ex.30 | 0.220 | 0.00 | No smoke and no open flame | 185.3 | 93.1 | 96.0 |
| Ex.31 | 0.220 | 0.08 | No smoke and no open flame | 184.7 | 93.2 | 96.0 |
| Ex.32 | 0.220 | −0.08 | No smoke and no open flame | 185.2 | 93.2 | 96.0 |
| Ex.33 | 0.220 | 0.00 | No smoke and no open flame | 178.3 | 86.9 | 91.0 |
| Ex.34 | 0.220 | 0.00 | No smoke and no open flame | 170.3 | 87.0 | 92.1 |
| Ex.35 | 0.220 | 0.00 | No smoke and no open flame | 155.2 | 87.1 | 93.9 |
| CEx.1 | 0.943 | −0.08 | Smoke and open flame | 783.2 | 87.0 | 89.9 |
| CEx.2 | 0.091 | 0.06 | No smoke and no open flame | 137.9 | 75.1 | 78.1 |
| CEx.3 | 0.220 | 0.30 | No smoke and no open flame | 183.6 | 75.0 | 78.0 |
| CEx.4 | / | 0.16 | No smoke and no open flame | 182.3 | 75.1 | 77.9 |
| CEx.5 | / | 0.16 | No smoke and no open flame | 184.5 | 80.0 | 82.9 |

Comparative analysis of Examples 1 to 7 and Comparative Example 3 showed that the lithium ion secondary batteries in which the positive electrode plate comprised the first positive electrode active material and the second positive electrode active material, and the electrolyte comprised the fluorine-containing lithium salt type additive exhibited significantly improved capacity retention after 400 cycles of 1 C/1 C at 45° C. and capacity retention after 60° C. storage for 60 days when the resistivity of the positive electrode plate is less than or equal to 3500 Ω·m and that the lithium ion secondary batteries had high safety performance, high temperature storage performance and cycle performance.

Comparative analysis of Examples 2, 5-7 and 16-20 and Comparative Examples 4-5 showed that the lithium ion secondary batteries in which the positive electrode plate comprised the first positive electrode active material and the second positive electrode active material, and the resistivity of the positive electrode plate is less than or equal to 3500 Ω·m exhibited significantly improved capacity retention after 400 cycles of 1 C/1 C at 45° C. and capacity retention after 60° C. storage for 60 days when the electrolyte comprised the fluorine-containing lithium salt type additive and that the lithium ion secondary batteries had high safety performance, high temperature storage performance and cycle performance.

Comparative analysis of Example 11 and Comparative Example 1 showed that when the weight v of manganese element contained in the positive electrode film per unit area of the lithium ion secondary battery is too low, the lithium ion secondary batteries exhibited significantly increased maximum surface temperature and showed smoke and flame phenomenon in needle puncture performance test for lithium ion secondary battery and that the lithium ion secondary battery had lower safety performance. Comparative analysis of Example 21 and Comparative Example 2 shows that when the weight v of manganese element contained in the positive electrode film per unit area of the lithium ion secondary battery is too large, the lithium ion secondary batteries exhibited decreased capacity retention after 400 cycles of 1 C/1 C at 45° C. and capacity retention after 60° C. storage for 60 days, resulting in the lithium ion secondary battery having lower high-temperature storage performance and cycle performance. When the weight v of manganese element contained in the positive electrode film per unit area of the lithium ion secondary battery was in the range of $1.1 \times 10^{-3}$ g/cm²·$9.1 \times 10^{-3}$ g/cm², especially in the range of $1.1 \times 10^{-3}$ g/cm²·$8.2 \times 10^{-3}$ g/cm², the lithium ion secondary battery had a higher safety performance, high-temperature storage performance and cycle performance at the same time.

Comparative analysis of Examples 9 to 14 and Example 8, and Examples 9 to 14 and Example 15 showed that when in the lithium ion secondary battery the ratio of the weight percentage u of the fluorine-containing lithium salt type additive in the electrolyte to the weight v of manganese element contained in the positive electrode film per unit area is too high or too low, the lithium ion secondary battery would exhibit reduced capacity retention after 400 cycles of 1 C/1 C at 45° C. and capacity retention after 60° C. storage for 60 days to a certain extent. When the weight percentage of manganese element contained in the positive active material and the weight percentage of the fluorine-containing lithium salt type additive in the electrolyte of the lithium ion secondary battery satisfy the above mentioned relationship (12), the lithium ion secondary battery exhibited a higher safety performance, high-temperature storage performance and cycle performance at the same time.

Comparative analysis of Examples 17 to 18 and Example 16, and Examples 17 to 18 and Examples 19 to 20 showed that when in the lithium ion secondary battery, the resistivity of the positive electrode plate and the ionic conductivity of the electrolyte had a higher or lower value based on the relationship ln r-$s_1$, the lithium ion secondary battery would exhibit reduced capacity retention after 400 cycles of 1 C/1 C at 45° C. and capacity retention after 60° C. storage for 60 days to a certain extent. When the positive electrode plate and the electrolyte of the lithium ion secondary battery satisfy the above mentioned relationship (22), the lithium ion secondary battery exhibited a higher safety performance, high-temperature storage performance and cycle performance at the same time.

Comparative analysis of Examples 22 to 32 with Examples 2 and 7 showed that by adding a predetermined content of negative electrode film-forming enhancer to the electrolyte, the capacity retention after 400 cycles of 1 C/1 C at 45° C. and capacity retention after 60° C. storage for 60 days of the lithium ion secondary battery were further improved to a certain extent and the lithium ion secondary battery exhibited a higher safety performance, high-temperature storage performance and cycle performance at the same time.

In combination with Examples 1 to 35, it can be seen that the lithium ion secondary battery according to embodiments of the present application can simultaneously exhibit a higher safety performance, high-temperature storage performance, and cycle performance.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A lithium ion secondary battery comprising a positive electrode plate, a negative electrode plate, a separator and an electrolyte, wherein
the positive electrode plate comprises a positive electrode current collector and a positive electrode film provided on at least one surface of the positive electrode current collector, and the positive electrode film comprises a first positive electrode active material represented by chemical formula (1) and a second positive electrode active material represented by chemical formula (2),

$$Li_{1+x}Ni_aCo_bMe_{1-a-b}O_{2-y}A_y \quad \text{chemical formula (1)}$$

$$Li_{1+z}Mn_cN_{2-c}O_{4-d}B_d \quad \text{chemical formula (2)}$$

in the chemical formula (1), −0.1≤x≤0.2, 0<a<1, 0<b<1, 0<a+b<1, 0≤y<0.2, Me comprises one or more of Mn, Fe, Cr, Ti, Zn, V, Al, Zr and Ce, and A comprises one or more of S, N, F, Cl, Br and I, in the chemical formula (2), −0.1≤z≤0.2, 0<c≤2, 0≤d<1, N comprises one or more of Ni, Fe, Cr, Ti, Zn, V, Al, Mg, Zr and Ce, and B comprises one or more of S, N, F, Cl, Br and I;

the positive electrode plate has a resistivity r of 3500 Ω·m or less; and, the electrolyte comprises a fluorine-containing lithium salt type additive;

wherein the positive electrode plate and the electrolyte in the lithium ion secondary battery satisfy the following formula (11)

$$0.005 \leq \frac{u}{100v} \leq 27.5 \quad \text{formula (11)}$$

in which v is weight of manganese element contained in the positive electrode film per unit area, in g/cm²; and u is weight percentage of fluorine-containing lithium salt type additive in the electrolyte, in wt %, and wherein the positive electrode plate and the electrolyte in the lithium ion secondary battery satisfy the following formula (21), $$-1.2 \leq \ln r - s_1 \leq 2 \quad \text{formula (21)}$$

in which, r is resistivity of the positive electrode plate in Ω·m; and $s_1$ is ionic conductivity of the electrolyte at 25° C. in mS/cm.

2. The lithium ion secondary battery according to claim 1, wherein the positive electrode plate and the electrolyte in the lithium ion secondary battery satisfy the following formula (22), $$-0.5 \leq \ln r - s_1 \leq 1.5 \quad \text{formula (22).}$$

3. The lithium ion secondary battery according to claim 1, wherein the resistivity of the positive electrode plate is 2500 Ω·m or less.

4. The lithium ion secondary battery according to claim 1, wherein the resistivity of the positive electrode plate is 1200 Ω·m or less.

5. The lithium ion secondary battery according to claim 1, wherein in the chemical formula (1), $0.5 \leq a < 1$, $0 < b < 0.5$, $0.7 \leq a+b < 1$, $0 \leq y < 0.1$, M is one or both of Mn and Al, and A is one or both of S and F.

6. The lithium ion secondary battery according to claim 1, wherein the fluorine-containing lithium salt type additive is one or more of a compound represented by chemical formula (3) and a compound represented by chemical formula (4),

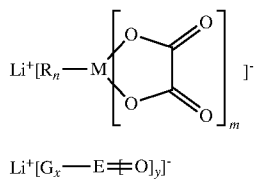

Chemical formula (3)

$Li^+[G_x$—$E$≡$O]_y]^-$

Chemical formula (4)

in the chemical formula (3), R is one or more of F, Cl, Br and I, and R comprises F, M is P or B, when M is P, n+2m=6, and m is 1 or 2, and when M is B, n+2m=4, and m is 0 or 1, in the chemical formula (4), G is one or more of F, Cl, Br and I, and G comprises F, E is P or B, when E is P, x+2y=6, and y is 1 or 2, and when E is B, x+2y=4, and y is 0 or 1.

7. The lithium ion secondary battery according to claim 6, wherein the fluorine-containing lithium salt type additive is one or more of lithium difluorophosphate $LiPO_2F_2$, lithium difluorooxalate phosphate LiDFOP, lithium tetrafluoroborate $LiBF_4$, and lithium difluorooxalate borate LiDFOB.

8. The lithium ion secondary battery according to claim 1, wherein the fluorine-containing lithium salt type additive is present in the electrolyte in a weight percentage u of 0.005 wt %-3 wt %.

9. The lithium ion secondary battery according to claim 1, wherein the fluorine-containing lithium salt type additive is present in the electrolyte in a weight percentage u of 0.1 wt %-2 wt %.

10. The lithium ion secondary battery according to claim 1, wherein the positive electrode film comprises manganese element in a weight v of $1.1 \times 10^{-3}$ g/cm$^2$–$9.1 \times 10^{-3}$ g/cm$^2$ per unit area.

11. The lithium ion secondary battery according to claim 1, wherein the positive electrode film comprises manganese element in a weight v of $1.1 \times 10^{-3}$ g/cm$^2$–$8.2 \times 10^{-3}$ g/cm$^2$ per unit area.

12. The lithium ion secondary battery according to claim 1, wherein the positive electrode plate and the electrolyte in the lithium ion secondary battery satisfy the following formula (12)

$$0.01 \leq \frac{u}{100v} \leq 20.0 \qquad \text{formula (12)}$$

in which v is weight of manganese element contained in the positive electrode film per unit area, in g/cm$^2$; and u is weight percentage of fluorine-containing lithium salt type additive in the electrolyte, in wt %.

13. The lithium ion secondary battery according to claim 1, wherein the electrolyte further contains a negative electrode film-forming enhancer; and the negative electrode film-forming enhancer is one or more of cyclic carbonates with unsaturated bonds in side chains, fluorine-containing cyclic carbonates and cyclic sulfonates.

14. The lithium ion secondary battery according to claim 13, wherein the negative electrode film-forming enhancer is one or more of vinyl ethylene carbonate VEC, methylene methanedisulfonate MMDS, difluoroethylene carbonate DFEC, trifluoromethyl ethylene carbonate TFPC, and 1-propene-1,3-sultone PST.

15. The lithium ion secondary battery according to claim 13, wherein the negative electrode film-forming enhancer is present in the electrolyte in a weight percentage of 0.005 wt %-6 wt %.

16. The lithium ion secondary battery according to claim 13, wherein the negative electrode film-forming enhancer is present in the electrolyte in a weight percentage of 0.01 wt %-5 wt %.

17. The lithium ion secondary battery according to claim 13, wherein the negative electrode film-forming enhancer is present in the electrolyte in a weight percentage of 0.1 wt %-2 wt %.

* * * * *